US010934448B2

(12) United States Patent
Brighenti et al.

(10) Patent No.: US 10,934,448 B2
(45) Date of Patent: Mar. 2, 2021

(54) BARRIER COATINGS

(71) Applicant: CARGILL, INCORPORATED, Wayzata, MN (US)

(72) Inventors: Mercedes Brighenti, Vilvoorde (BE); Olaf Meinders, Vilvoorde (BE); Dogan Sahin Sivasligil, Vilvoorde (BE); Richard Thalhofer, Vilvoorde (BE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/060,339

(22) PCT Filed: Dec. 7, 2016

(86) PCT No.: PCT/US2016/065369
§ 371 (c)(1),
(2) Date: Jun. 7, 2018

(87) PCT Pub. No.: WO2017/100316
PCT Pub. Date: Jun. 15, 2017

(65) Prior Publication Data
US 2018/0362792 A1 Dec. 20, 2018

(30) Foreign Application Priority Data
Dec. 9, 2015 (EP) .................................... 15198571

(51) Int. Cl.
| | | |
|---|---|---|
| *C09D 103/00* | (2006.01) | |
| *C09D 103/02* | (2006.01) | |
| *C09D 103/04* | (2006.01) | |
| *D21H 19/54* | (2006.01) | |
| *D21H 23/48* | (2006.01) | |
| *D21H 27/10* | (2006.01) | |
| *B32B 9/06* | (2006.01) | |
| *B32B 9/02* | (2006.01) | |
| *D21H 19/00* | (2006.01) | |
| *C08K 5/053* | (2006.01) | |
| *C08L 29/04* | (2006.01) | |
| *C08L 33/10* | (2006.01) | |
| *C08L 33/26* | (2006.01) | |
| *C08L 79/02* | (2006.01) | |

(52) U.S. Cl.
CPC .............. *C09D 103/02* (2013.01); *B32B 9/02* (2013.01); *B32B 9/06* (2013.01); *C09D 103/04* (2013.01); *D21H 19/00* (2013.01); *D21H 19/54* (2013.01); *D21H 23/48* (2013.01); *D21H 27/10* (2013.01); *B32B 2307/7265* (2013.01); *B32B 2439/00* (2013.01); *B32B 2439/70* (2013.01); *C08K 5/053* (2013.01); *C08L 29/04* (2013.01); *C08L 33/10* (2013.01); *C08L 33/26* (2013.01); *C08L 79/02* (2013.01)

(58) Field of Classification Search
None
See application file for complete search history.

(56) References Cited

U.S. PATENT DOCUMENTS

| | | | | |
|---|---|---|---|---|
| 6,007,614 A | * | 12/1999 | Billmers .............. | C09D 103/06 106/207.1 |
| 6,231,970 B1 | * | 5/2001 | Andersen .................. | C08L 3/02 106/145.1 |
| 7,320,825 B2 | | 1/2008 | Morabito | |
| 2004/0241475 A1 | * | 12/2004 | Morabito ................ | B32B 27/20 428/507 |
| 2008/0027174 A1 | * | 1/2008 | Kawamura .......... | C09D 151/02 525/54.26 |
| 2012/0308749 A1 | * | 12/2012 | Seyffer .................. | D21H 19/24 428/34.3 |

FOREIGN PATENT DOCUMENTS

| | | | |
|---|---|---|---|
| EP | 1154073 A2 | 11/2001 | |
| EP | 1170418 A1 | 1/2002 | |
| GB | 2418380 A | 3/2006 | |
| WO | 0192400 A2 | 12/2001 | |
| WO | 0192401 A2 | 12/2001 | |
| WO | WO-2006111981 A2 * | 10/2006 | ............. A61K 9/284 |
| WO | 2011018146 A1 | 2/2011 | |
| WO | 2013180643 A1 | 12/2013 | |
| WO | WO-2014189999 A1 * | 11/2014 | ................ C08L 5/00 |
| WO | WO-2015036391 A1 * | 3/2015 | ............. D21H 19/12 |

OTHER PUBLICATIONS

Cyras, Viviana P., "Relationship between Structure and Properties of Modified Potato Starch Biodegradable Films", Journal of Applied Polymer Science, Sep. 15, 2006, 4313-4319.
Jansson, Agneta , et al., "Barrier and Mechanical Properties of Modified Starches", Cellulose, Kluwer Academic Publishers (Dordrecht), NL. vol. 12, No. 4, Aug. 1, 2005, 423-433.
Liu, P. , et al., "Glass Transition Temerature of Starch Studied by a High-Speed DSC", Carboydrate Polymers, Applied Science Publishers, Ltd. Barking, GB, vol. 77, No. 2, Jun. 10, 2009, 250-253.
Liu, P. , et al., "Glass Transition Temperature of Starches with Different Amylose/Amylopectin Ratios", Journal of Cereal Science, Academic Press Ltd., GB, vol. 51, No. 3, May 1, 2010, 388-391.
"European Application Serial No. 16812901.3, Communication pursuant to Article 94(3) EPC dated Jul. 2, 2020", 6 pgs.
"European Application Serial No. 16812901.3, Communication pursuant to Rule 161(1) and 162 EPC dated Jul. 17, 2018", 3 pgs.
"European Application Serial No. 16812901.3, Response to Communication pursuant to Rule 161(1) and 162 EPC filed Jan. 21, 2019", 5 pgs.
"International Application Serial No. PCT/US2016/065369, International Preliminary Report on Patentability dated Jun. 12, 2018", 8 pgs.

* cited by examiner

*Primary Examiner* — Stefanie J Cohen

(57) ABSTRACT

A barrier coating composition comprising a starch material characterised in that the starch material has a weight average molecular weight of 50.000 to 1.000.000 Dalton and a glass transition temperature (Tg) of no more than 120° C.

20 Claims, No Drawings

BARRIER COATINGS

CROSS REFERENCE TO RELATED APPLICATIONS

This application is a national phase application of PCT/US2016/065369, filed 7 Dec. 2016, entitled BARRIER COATINGS, which claims the benefit of priority to European Application No. 15198571.0 filed 9 Dec. 2015, entitled BARRIER COATINGS, which are hereby incorporated by reference in their entirety.

TECHNICAL FIELD OF THE INVENTION

The present invention relates to starch barrier coatings, to paper products coated therewith, and to methods of applying the coatings to the paper products.

BACKGROUND OF THE INVENTION

Cellulose-based paper products are often used as, or in the manufacture of, packaging materials. These may be used for the storage, transport and/or sale of a variety of products, including food and beverage products. Packaging materials used for food and beverage products must have certain specific properties that may not be essential in other applications. For example, the packaging materials must not contain toxins that could be transferred to the food or beverage products they are used with, they may need to help prolong product shelf life, to be rigid enough to prevent product damage, and may need to prevent certain gases from reaching the food products and imparting undesirable flavours or smells. More recently, manufacturers have wanted to be able to offer packaging materials that are resistant to mineral oil migration.

Mineral oils are derived from crude oil and coal. They are indigestible and, in some cases (mineral oil aromatic hydrocarbons), carcinogenic. They are used in the production of inks and certain coatings that are often used on paper product, including packaging materials. They become volatile (evaporate) at room temperature and can then migrate from the packaging to the packaging contents. There is therefore a risk of mineral oil contamination when using printed packaging materials for food and beverage products. This risk increases with the use of recycled or partly recycled packaging materials as mineral oils tend to accumulate in recycled paper products. But the risk need not come from the primary of secondary food packaging itself. Mineral oils may also migrate from other nearby packaged goods or simply from the environment.

One way to prevent—or at least limit—migration of mineral oils is through the use of a functional barrier. Polyethylene or polypropylene plastic bags have been used to this end but this results in undesirable additional packaging and extra cost. Functional barriers that can be applied directly to the paper packaging materials in the form of coatings have therefore been proposed EP2532706A1 (Mayr-Melnhof), for example, discloses a method of producing a coated packaging material wherein the coating acts as a barrier for hydrophobic compounds such as mineral oils. The method includes the step of "coating the inside of the substrate with at least one layer of an aqueous composition including at least polyvinyl alcohol and a cross-linking agent and having a solid content of at most 25% by weight". The use of PVOH, however, is expensive. What's more, because of its high viscosity, the potential dry substance of coating compositions based on it will be limited (thereby increasing the time and energy needed for drying).

EP2714990A1 (BASF) relates to barrier layers for recycled paper or board with mineral oil contamination, the layer being produced by applying an aqueous polymer dispersion comprising at least one copolymer which is obtainable by emulsion polymerisation of one or more main monomers selected from C1-C4 alkyl (meth) acrylates, one or more acid monomers, acrylonitrile, and other momomers. These copolymers, however, are relatively expensive and can be sticky, requiring additional pigment to be added EP2773707A1 (Billerud) is directed to a curtain coatable gas barrier coating composition comprising a polysaccharide and a surfactant, wherein the surfactant is a water-soluble non-ionic ethoxylated alcohol, characterised in that the solids content of the composition is 4-15% and the surfactant has the formula RO(CH2CH2O)XH, wherein: R=iso-C13H27 and X is 8 or higher; or R=iso-C10 and X is 5, 6, 7, 8 or 11. The limitations on solids content of the composition may, however, prove costly with significant time and energy being required to dry the coating.

WO2014/193779 also describes compositions based on starches, which are suitable as adhesives. Typical starch-based adhesives are composed of one or more starches (which may be either native and/or modified) and water, together with additives such as borax and caustic soda. Borax is a salt of boric acid. It is used to increase the viscosity of the adhesive and give it its required structure. It increases the adhesive's wet tack, and improves its film-forming and water-holding properties. For these reasons, it has for a long time been considered an essential component of starch-based adhesives. However, since 2008, a number of boron-based compounds, including boric acid, have been classified as toxic for reproduction. In June 2010, these compounds were placed on the Substances of Very High Concern (SVHC) candidate list. The SVHC candidate list is part of the EU Regulations on the Registration, Evaluation, Authorization and Restriction of Chemicals (REACH). Under these regulations, the presence of SVHC-classified compounds in compositions at levels of 0.1% by weight or above must be communicated (e.g. using Material Safety Data Sheets). What's more, there is a risk that the use of these compounds in certain applications (such as for the preparation of adhesives) may soon need a special authorization.

It is the object of the present invention to provide a simple and inexpensive coating composition, which can be applied using existing techniques and at relatively high dry substance, to produce packaging materials that have effective gas barrier coating functionality. There is also a clear need to develop coatings which are borax-free especially where these coatings are intended for use with food packaging materials. The present invention provides such coatings.

SUMMARY OF THE INVENTION

According to a first aspect of the present invention, there is provided a barrier coating composition comprising a starch material characterised in that: the starch material has a weight average molecular weight of 25.000 to 1.000.000 Daltons, preferably of 50.000 to 1.000.000 Daltons and a glass transition temperature (Tg) of no more than 120° C.

According to another aspect of the present invention, there is provided a paper product comprising at least one barrier coating layer, said barrier coating layer comprising a starch material characterised in that: the barrier coating layer has an average coat weight of 5 to 20 g/m²; the starch material has an weight average molecular weight of 25.000 to 1.000.000 Daltons, preferably of 50.000 to 1.000.000 Daltons and a glass transition temperature (Tg) of no more than 120° C.

According to a further aspect of the present invention, there is provided a process for the production of a paper product comprising at least one barrier coating layer, comprising coating a cellulose-based substrate with the above barrier coating composition.

According to a yet further aspect of the present invention, there is provided the use of the above barrier coating composition to prevent the migration of mineral oils through cellulose-based substrates.

DESCRIPTION

Thus, the present invention provides a barrier coating composition comprising a starch material, characterised in that the starch material has a weight average molecular weight of 25.000 to 1.000.000 Daltons, preferably of 50.000 to 1.000.000 Daltons, and a glass transition temperature (Tg) of no more than 120° C.

The starch material will have a weight average molecular weight, determined according to Method 3, of 25.000 to 1.000.000 Daltons. Preferably, said weight average molecular weight is at least 28.000 Daltons, more preferably at least 30.000 Daltons, most preferably at least 33.000 Daltons. Preferably said weight average molecular weight is at most 500.000 Daltons, more preferably at most 350.000 Daltons, most preferably at most 200.000 Daltons. Preferably, said weight average molecular weight is between 50.000 to 500.000 Daltons, more preferably of 100.000 to 300.000 Daltons; and a glass transition temperature (Tg) of no more than 120° C., preferably of 25 to 100° C., more preferably of 50 to 80° C., more preferably of 60 to 70° C. The glass transition temperature of an amorphous material is the temperature at which it reversibly transitions from a hard, glassy (and relatively brittle) material to a molten one, soft and rubbery in consistency. The glass transition temperature of the starch material used in accordance with the present invention is measured as is (i.e. with 10-15% equilibrium moisture content), according to Method 1.

In a preferred embodiment, the present invention provides a barrier coating composition comprising a starch material, characterised in that the starch material has a weight average molecular weight of between 25.000 and 500.000, more preferably between 28.000 and 300.000, most preferably between 33.000 and 200.000 and a glass transition temperature (Tg) of no more than 120° C., preferably of 25 to 100° C., more preferably of 50 to 80° C., more preferably of 60 to 70° C. Preferably, the composition of this embodiment is free of boron containing compounds.

Preferably, the pH of the composition according to the invention is at least 2.0, more preferably at least 2.3, most preferably at least 2.6. Preferably, said pH is at most 10.5, more preferably at most 10.0, most preferably at most 9.5. Preferably, said pH is between 2.0 and 10.5, more preferably between 2.3 and 10.0, most preferably between 2.6 and 9.5.

In a preferred embodiment, the present invention provides a barrier coating composition comprising a starch material, characterised in that the starch material has a weight average molecular weight of between 25.000 and 500.000, more preferably between 28.000 and 300.000, most preferably between 33.000 and 200.000 and a glass transition temperature (Tg) of no more than 120° C., preferably of 25 to 100° C., more preferably of 50 to 80° C., more preferably of 60 to 70° C. Preferably, the composition of this embodiment is free of boron containing compounds. Preferably, the pH of the composition of this embodiment is between 2.0 and 10.5, more preferably between 2.3 and 10.0, most preferably between 2.6 and 9.5.

Barrier Coating Compositions

As used herein, the term "barrier coating composition" shall refer to a composition, in dry or liquid form, intended to be used in coating a substrate, typically a cellulose-based substrate, and which, in use, has some form of barrier functionality. Once applied to the substrate, the coating composition will be referred to as a "barrier coating layer".

A coating composition with barrier functionality will be capable of preventing certain substances (e.g. moisture, grease, oils, oxygen) from permeating through the coated substrate. The barrier coating composition of the present invention (and the corresponding barrier coating layer) will preferably be capable of preventing—or at least limiting—mineral oil migration through the coated substrate. They have also surprisingly been found to provide good grease resistance.

Starch Material:

the starch material used in accordance with the present invention may be any starch, starch derivative, or mixture thereof. Starch derivatives include, for example, chemically modified, thermally modified and enzymatically modified starches such as thinned, esterified, etherified (e.g. hydroxypropylated), or acetylated starches. They also include depolymerized starch molecules such as dextrins, maltodextrins and pyrodextrins and cross-linked starches. The starch material may be from any source including, for instance, waxy or dent corn, wheat, tapioca, potato or waxy potato, rice, barley or pea. Advantageously, the starch material will be selected from a thermally modified starch (TMS), a dextrin, a waxy starch and mixtures thereof. For example, the starch material may simply consist of a dextrin or a TMS, or it may be a mixture of TMS and waxy starch or of dextrin and waxy starch. If such a mixture is used, the TMS or dextrin and waxy starch will preferably be present in a dry weight ratio of 50:50 to 20:1, preferably of 70:30 to 95:5, more preferably of 3:1 to 90:5. Most preferably, the starch material used in accordance with the invention is a dextrin having the weight average molecular weight and the glass transition temperature as specified above. Compositions of the present invention will preferably comprise at least 10%, more preferably 10-90%, more preferably 25-80% of the starch material by weight, based on total dry weight.

Composition of the present invention will preferably have a solids content of at least 10 wt %, more preferably at least 15 wt %, most preferably at least 20 wt %. Preferably said solids content is at most 75 wt %, more preferably at most 65 wt %, most preferably at most 60 wt %. Said solids content is preferably between 10 wt % and 70 wt %, more preferably between 15 wt % and 60 wt %, most preferably between 15 and 55 wt %.

The composition of the invention or indeed the barrier coating layer produced therewith, may further comprise one or more pigments.

Pigment:

Examples of pigments suitable for use in the present invention include clays such as structured and calcined clays, hydrated aluminum silicates (such as kaolin clay), bentonite, natural and synthetic calcium carbonate, calcium sulphate (gypsum), silicas, precipitated silicas, titanium dioxide, alumina, aluminium trihydrate, plastic (polystyrene) pigments, satin white, talc, barium sulphate, zinc oxide and mixtures of two or more thereof. The appropriate pigment will readily be selected by a skilled person depending on the type of coating composition being produced.

Pigments are typically included in coating compositions in far greater amounts than any other single ingredient (so that, for example, the starch content would be expressed "per 100 parts pigment"). Surprisingly, however, it has been found that the barrier coating compositions of the present invention need not include any pigment. Thus, the compositions of the present invention may include from 0% pigment by weight. Preferably, if using pigment, the composition will comprise up to 50% pigment by weight, based on total dry weight. More preferably, it will comprise 10-30%, more preferably 10-20% pigment by weight. The composition will preferably comprise the starch material and the pigment in a dry weight ratio from 1:1 to 5:1.

Additional Ingredients:

The barrier coating composition of the present invention, or indeed the barrier coating layer produced therewith, may also comprise one or more additives. Examples of possible additives, if used, may include: thickeners (such as cellulose ethers, alginates, gums such as xanthan gum, native or modified starches, and synthetic polymers), synthetic binders (such as styrene butadiene, styrene acrylate, vinyl polymer based latexes, and polyvinyl alcohol), surfactants (such as cationic surfactants, anionic surfactants, non-ionic surfactants, amphoteric surfactants and fluorinated surfactants), hardeners (such as active halogen compounds, vinylsulfone compounds and epoxy compounds), dispersing agents (such as polyacrylates, polyphosphates, and polycarboxylates), flowability improvers, lubricants (such as calcium, ammonium and zinc stearate, wax or wax emulsions, alkyl ketene dimer, and glycols), antifoamers (such as octyl alcohol and silicone-based antifoamers), releasing agents, foaming agents, penetrants, optical brighteners (such as fluorescent whiteners), preservatives (such as benzisothiazolone and isothiazolone compounds), biocides (such as metaborate, thiocyanate, and sodium benzoate), yellowing inhibitors (such as sodium hydroxymethyl sulfonate, and sodium p-toluenesulfonate), ultraviolet absorbers (such as benzotriazole compounds having a hydroxy-dialkylphenyl group at the 2 position), antioxidants (such as sterically hindered phenol compounds), insolubilisers, antistatic agents, pH regulators (such as sodium hydroxide, sulfuric acid and hydrochloric acid), water-resisting agents (such as ketone resin, anionic latex, and glyoxal), plasticisers, wet and/or dry strengthening agents (such as glyoxal based resins, oxidised polyethylenes, melamine resins, urea formaldehyde), cross-linking agents (such as glyoxal, gluteraldehydes, and ammonium zirconium carbonates), gloss-ink holdout additives, grease and oil resistance additives, leveling and evening aids (such as polyethylene emulsions, and alcohol/ethylene oxide), and mixtures of two or more thereof. The amount of each of these compounds to be added, if at all, will be determined in accordance with standard practice and with the desired properties of the particular coating composition being produced. Preferably, the barrier coating composition will comprise a plasticiser.

In a preferred embodiment, the barrier coating composition of the present invention, or indeed the barrier coating layer produced therewith, comprises a synthetic binder. Preferably said binder is present in an amount of at least 1 wt % (dry basis), more preferably at least 5 wt % (dbs), most preferably at least 10 wt % (dbs). Preferably said amount is at most 95 wt % (dry basis), more preferably at most 50 wt % (dbs), most preferably at most 20 wt % (dbs). Preferably, said binder is chosen from the group consisting of polyamine, polyacrylates, polyacrylamides, polyamides, styrene butadiene, styrene acrylate, latexes, vinyl polymer based latexes, and polyvinyl alcohol. More preferably said binder is chosen from the group consisting of polyamine and polyvinyl alcohol. Most preferably, said binder is polyvinyl alcohol.

In a preferred embodiment, the present invention provides a barrier coating composition comprising a starch material and a synthetic binder, characterised in that the starch material has a weight average molecular weight of between 25.000 and 500.000, more preferably between 28.000 and 300.000, most preferably between 33.000 and 200.000 and a glass transition temperature (Tg) of no more than 120° C., preferably of 25 to 100° C., more preferably of 50 to 80° C., more preferably of 60 to 70° C. Preferably, the composition of this embodiment is free of boron containing compounds. Preferably, the pH of the composition of this embodiment is between 2.0 and 10.5, more preferably between 2.3 and 10.0, most preferably between 2.6 and 9.5. Preferably said binder is present in an amount of at least 1 wt % (dry basis), more preferably at least 5 wt % (dbs), most preferably at least 10 wt % (dbs). Preferably said amount is at most 95% wt (dry basis), more preferably at most 50 wt % (dbs), most preferably at most 20 wt % (dbs). Preferably, said binder is chosen from the group consisting of polyamine, polyacrylates, polyacrylamides, polyamides, styrene butadiene, styrene acrylate, latexes, vinyl polymer based latexes, and polyvinyl alcohol. More preferably said binder is chosen from the group consisting of polyamine and polyvinyl alcohol. Most preferably, said binder is polyvinyl alcohol.

Plasticiser:

The term "plasticiser" as used herein will refer to any compound or composition capable of imparting plasticity to the composition of the invention—and flexibility to the barrier coating layer in use.

The plasticizer will advantageously be water soluble and, more advantageously, cold water soluble. It will preferably be selected from the group consisting of carbohydrates, polyols, synthetic polymers and/or oligomers, and mixtures of two or more thereof.

Carbohydrates suitable for use as plasticisers will preferably have a DE of 10 to 100, more preferably of 30 to 100, more preferably of 40 to 90. Advantageously, they will be selected from maltodextrin, mono-, di-, tri- or tetrasaccharides, mixtures thereof and/or syrups thereof. For example, the plasticiser may be a monosaccharide such as glucose, a glucose syrup, a sugar (such as sucrose), dextrose, or a starch hydrolysate. Preferably, it will comprise or consist of glucose (e.g. glucose monohydrate) or a glucose syrup.

A polyol is an alcohol containing multiple hydroxyl groups. Examples of polyols suitable for use as a plasticiser include glycol, glycerol, sorbitol, maltitol, and mixtures thereof. Preferably, the plasticiser will comprise or consist of glycerol (in the case of liquid binder compositions) or sorbitol (in the event of dry binder compositions), e.g. anhydrous sorbitol.

Examples of suitable plasticisers include, for instance, a mixture of sorbitol and glucose (or a glucose syrup), a mixture of sorbitol and dextrose, a mixture of sorbitol, dextrose and glucose (or a glucose syrup)—all preferably used in dry binder compositions—or a mixture of glycerol and glucose (or a glucose syrup)—for aqueous binder compositions.

Synthetic polymers and/or oligomers suitable for use as a plasticiser may include, for example, polyethers and polyesters. Preferably, the plasticiser will comprise or consist of polyethylene glycol (PEG).

Preferably, plasticisers of the present invention will be selected from glycerol, sorbitol and mixtures thereof. More preferably, the plasticiser will consist of glycerol. A possible composition of the invention could therefore comprise, by way of example only, dextrin, glycerol and glucose.

Preferably, the plasticizers are used in an amount of at least 1 wt % (dry basis), more preferably at least 3 wt % (dbs), most preferably at least 5 wt % (dbs). Preferably said amount is at most 60 wt % (dry basis), more preferably at most 40 wt % (dbs), most preferably at most 25 wt % (dbs). Preferably, said plasticizer is chosen from the group consisting of maltodextrin, mono-, di-, tri- or tetrasaccharides, mixtures thereof and/or syrups thereof; monosaccharides such as glucose, a glucose syrup, a sugar (such as sucrose), dextrose, or a starch hydrolysate; polyols such as glycol, glycerol, sorbitol, maltitol, and mixtures thereof; and combinations thereof. More preferably, the plasticizer is a polyol, most preferably a polyol chosen from the group consisting of glycol, glycerol, sorbitol, maltitol, and mixtures thereof.

In a preferred embodiment, the present invention provides a barrier coating composition comprising a starch material, a plasticizer and preferably a synthetic binder, characterised in that the starch material has a weight average molecular weight of between 25.000 and 500.000, more preferably between 28.000 and 300.000, most preferably between 33.000 and 200.000 and a glass transition temperature (Tg) of no more than 120° C., preferably of 25 to 100° C., more preferably of 50 to 80° C., more preferably of 60 to 70° C. Preferably, the composition of this embodiment is free of boron containing compounds. Preferably, the pH of the composition of this embodiment is between 2.0 and 10.5, more preferably between 2.3 and 10.0, most preferably between 2.6 and 9.5. When used, said binder is preferably present in an amount of at least 1 wt % (dry basis), more preferably at least 5 wt % (dbs), most preferably at least 10 wt % (dbs). Preferably the amount of said binder is at most 95 wt % (dry basis), more preferably at most 50 wt % (dbs), most preferably at most 20 wt % (dbs). Preferably, said binder is chosen from the group consisting of polyamine, polyacrylates, polyacrylamides, polyamides, styrene butadiene, styrene acrylate, latexes, vinyl polymer based latexes, and polyvinyl alcohol. More preferably said binder is chosen from the group consisting of polyamine and polyvinyl alcohol. Most preferably, said binder is polyvinyl alcohol. Preferably, the plasticizer is used in an amount of at least 1 wt % (dry basis), more preferably at least 3 wt % (dbs), most preferably at least 5 wt % (dbs). Preferably the amount of said plasticizer is at most 60 wt % (dry basis), more preferably at most 40 wt % (dbs), most preferably at most 25 wt % (dbs). Preferably, said plasticizer is chosen from the group consisting of maltodextrin, mono-, di-, tri- or tetrasaccharides, mixtures thereof and/or syrups thereof; monosaccharides such as glucose, a glucose syrup, a sugar (such as sucrose), dextrose, or a starch hydrolysate; polyols such as glycol, glycerol, sorbitol, maltitol, and mixtures thereof; and combinations thereof. More preferably, the plasticizer is a polyol, most preferably a polyol chosen from the group consisting of glycol, glycerol, sorbitol, maltitol, and mixtures thereof.

Barrier coating compositions of the present invention will preferably comprise from 15 to 75% dry solids by weight, more preferably 20-60%, more preferably 25-40% by weight. It is indeed an advantage of the present invention that the barrier coating composition may comprise more than 25% dry solids by weight. This is significantly higher than comparable compositions in the art and will allow manufacturers to accelerate production and reduce costs by limiting the amount of time and energy required to dry the coating once applied to its substrate.

According to another advantage of the invention, the present barrier coating compositions can be used to replace, in whole or in part, the use of barrier compositions based on synthetic polymers such as polyamine, polyvinyl alcohol, polyacrylates, polyacrylamides and polyamides (referred to herein as "synthetic barrier compositions"). Thus, the barrier coating compositions of the invention can be used to replace 10% or more, preferably 20% or more, preferably 30% or more, preferably 40% or more, preferably 50% or more, preferably 60% or more, preferably 70% or more of a synthetic barrier composition by weight, on a dry weight basis. However, that also means that the barrier coating compositions (and barrier coating layers) of the present invention may comprise one or more synthetic polymers (also referred to hereinabove as synthetic binders) such as polyamine and/or polyvinyl alcohol. If included, the synthetic polymer and starch material will preferably be included in a dry weight ratio from 1:10 to 10:1, to 1:2 to 2:1.

Paper Products

The barrier coating compositions of the present invention are used to coat a substrate in a substantially continuous layer (referred to herein as a "barrier coating layer"). The substrate will preferably be a cellulose-based substrate such as paper or board. Thus the present invention provides a coated product comprising a substrate and a layer applied on said substrate, said layer comprising a starch material having a weight average molecular weight of 25.000 to 1.000.000 Daltons, preferably of 50.000 to 1.000.000 Daltons, and a glass transition temperature (Tg) of no more than 120° C. The above given preferred values for the weight average molecular weight and for the glass transition temperature are equally applicable for the coated product of the invention and will not be repeated herein. Preferably, said layer further comprises a plasticizer and/or a synthetic binder. Preferably, the starch material has a weight average molecular weight of between 25.000 and 500.000, more preferably between 28.000 and 300.000, most preferably between 33.000 and 200.000 and a glass transition temperature (Tg) of no more than 120° C., preferably of 25 to 100° C., more preferably of 50 to 80° C., more preferably of 60 to 70° C. Preferably, the layer is free of boron containing compounds. When used, said binder is preferably present in an amount of at least 1 wt % (dry basis), more preferably at least 5 wt % (dbs), most preferably at least 10 wt % (dbs). Preferably the amount of said binder is at most 95 wt % (dry basis), more preferably at most 50 wt % (dbs), most preferably at most 20 wt % (dbs). Preferably, said binder is chosen from the group consisting of polyamine, polyacrylates, polyacrylamides, polyamides, styrene butadiene, styrene acrylate, latexes, vinyl polymer based latexes, and polyvinyl alcohol. More preferably said binder is chosen from the group consisting of polyamine and polyvinyl alcohol. Most preferably, said binder is polyvinyl alcohol. When used, said plasticizer is preferably present in an amount of at least 1 wt % (dry basis), more preferably at least 3 wt % (dbs), most preferably at least 5 wt % (dbs). Preferably the amount of said plasticizer is at most 60 wt % (dry basis), more preferably at most 40 wt % (dbs), most preferably at most 25 wt % (dbs). Preferably, said plasticizer is chosen from the group consisting of maltodextrin, mono-, di-, tri- or tetrasaccharides, mixtures thereof and/or syrups thereof; monosaccharides such as glucose, a glucose syrup, a sugar (such as sucrose), dextrose, or a starch hydrolysate; polyols such as glycol, glycerol, sorbitol, maltitol, and mixtures thereof; and combinations thereof. More preferably, the plasticizer is a polyol, most preferably a polyol chosen from the group consisting of glycol, glycerol, sorbitol, maltitol, and mixtures thereof. Preferably, said substrate is paper or board, most preferably paper (in which case the coated product is also referred to as paper product).

Preferably, said layer has an average density (or "coat weight") of at least 1 $g/m^2$, more preferably of at least 3 $g/m^2$, even more preferably of at least 5 $g/m^2$, most preferably of at least 7 $g/m^2$. Preferably, the average density of said layer is at most 50 $g/m^2$, more preferably at most 40 $g/m^2$, even more preferably at most 30 $g/m^2$, yet even more preferably at most 20 $g/m^2$, most preferably at most 15 $g/m^2$. Preferably, the average density of said layer is of 5 to 20 $g/m^2$, more preferably of 5-15 $g/m^2$, more preferably of 7-15 $g/m^2$ or 7-13 $g/m^2$.

Preferably, said layer has a hexane permeability (measured according to Method 2) of no more than 100 $g/m^2d$, more preferably of no more than 50 $g/m^2d$, more preferably of no more than 20 $g/m^2d$. Preferably, said hexane permeability is as low as possible, however for practical reasons, it is preferably at least 0.1 $g/m^2d$, more preferable at least 0.5 $g/m^2d$, even more preferably at least 1.0 $g/m^2d$, most preferably at least 3.0 $g/m^2d$.

Preferably, said layer has a grease resistance of at least 1, more preferably of at least 3, more preferably of at least 5. Preferably, said grease resistance is as high as possible, however, for practical reasons, it is preferably at most 30, more preferably at most 20, most preferably at most 15.

Preferably, said layer has a hexane permeability of no more than 50 $g/m^2d$ and a grease resistance of at least 1, more preferably of at least 3, more preferably of at least 5. Preferably, said layer has a hexane permeability of no more than 20 $g/m^2d$ and a grease resistance of at least 1, more preferably of at least 3, more preferably of at least 5.

In a preferred embodiment, the average density of said layer is of 5 to 20 $g/m^2$, the hexane permeability of said layer is between 0.1 and 100 $g/m^2d$ and the grease resistance is between 1 and 30. Preferred ranges of the average density, hexane permeability and grease resistance are given above and are equally applicable to this embodiment also.

The present invention also provides a paper product comprising at least one barrier coating layer according to the invention.

The present invention also provides a paper product comprising at least one barrier coating layer, said barrier coating layer comprising a starch material and a pigment, characterised in that the barrier coating layer has an average thickness of at least 3 μm and an average density of 5 to 20 $g/m^2$.

Paper Product:

the paper product of the present invention may be any kind of paper- or board-based product, preferably produced from a cellulose-based substrate. The substrate will preferably be sheet-type material produced, for example, from virgin wood-based fibers, recycled fibers, or from mixtures thereof. It may be of any grade, thickness, weight, and quality and will comprise at least one coating layer according to the present invention on at least one side. That layer may be a pre-coat, middle coat or top coat. The one or more other layers, if used, may be in accordance with the invention or they may be produced from synthetic barrier compositions. Thus, for example, the paper product may comprise a pre-coat in accordance with the invention and a top coat produced from a synthetic barrier composition. Alternatively, it may comprise a synthetic barrier pre-coat layer and a top coat layer in accordance with the invention. Alternatively, it may comprise at least two layers in accordance with the invention. Preferably the paper product will include at least one pre-coat layer.

The paper product will preferably be used as a packaging material, more preferably as a packaging material for food and/or beverage compositions. It may be used as a primary or secondary packaging material, and for the sake of illustration only, for the production of boxes, trays, lids, cartons or any other form of packaging material.

Advantageously, the paper products of the present invention will be at least partially impermeable to mineral oil migration. Preferably, they will have a hexane permeability (measured according to Method 2) of no more than 100 $g/m^2d$, more preferably of no more than 50 $g/m^2d$, more preferably of no more than 20 $g/m^2d$. Thus, the present invention also provides the use of a barrier coating composition as defined herein to prevent the migration of mineral oils through cellulose-based substrates.

Barrier Coating Layer:

the barrier coating layer comprises at least a starch material and a pigment, together with one or more additional optional ingredients, all as defined above in relation to the barrier coating composition. It will preferably have an average density (or "coat weight") of at least 1 $g/m^2$, more preferably of at least 3 $g/m^2$, even more preferably of at least 5 $g/m^2$, most preferably of at least 7 $g/m^2$. Preferably, the average density of said layer is at most 50 $g/m^2$, more preferably at most 40 $g/m^2$, even more preferably at most 30 $g/m^2$, yet even more preferably at most 20 $g/m^2$, most preferably at most 15 $g/m^2$. Preferably, the average density of said layer is of 5 to 20 $g/m^2$, more preferably of 5-15 $g/m^2$, more preferably of 7-15 $g/m^2$ or 7-13 $g/m^2$. It will preferably have an average thickness of at least 3 μm.

Process

In addition to barrier coating compositions and paper products coated therewith, the present invention provides a process for the production of such paper products, comprising coating a cellulose-based substrate with a barrier coating composition as defined above.

The barrier coating composition will preferably be applied in the form of an aqueous composition. It will preferably be prepared, therefore, by dispersing the starch material, pigment, and any additional optional ingredients, in water. These dry ingredients may be added in any order or simultaneously. If necessary, the composition may be heated to ensure proper solubilisation of the ingredients. Further water may be added to the aqueous composition thus prepared to achieve the desired dry solid content of the final barrier coating composition.

The barrier coating composition may then be applied to the substrate using any method known in the art. These include, for example, air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating and transfer roll coating (metered size press or gate roll coating). Preferably, the barrier coating composition of the present invention will be applied to its substrate by curtain coating. Thus, the present invention preferably provides a barrier coating composition, as defined above, suitable for curtain coating of a cellulose-based substrate.

Coating may occur on the sheet-forming machine or on a separate coating machine. After the coating composition has been applied, any excess will preferably be removed. The paper may then be dried and optionally calendered to improve surface smoothness and gloss and to reduce bulk.

The present invention will now be described in more detail by way of the following non-limiting examples.

Examples

Method of Preparation of the Coating Composition (Order and Equipment Used)

PVOH—The PVOH was dissolved in water (20 minutes at 96° C. batch cooking under stirring) to 20% dry substance by weight. The solution was cooled down to room temperature before determining its dry substance.

Pigment—clay (Capim RG) was dispersed in water with a pilot dissolver before determining its dry substance.

Starch—The starch samples (C*iFilm samples from Cargill) were cooked with a pilot jet cooker (5 mins at 130° C.) at the highest possible dry substance. The cooked starch was cooled down to room temperature before the determining its dry substance.

Composition—The components were mixed together in a steered vessel. The amounts were calculated according to the recipes provided in the table.

The sequence was: Starch paste->PVOH solution->Plasticiser (sorbitol sold as Sorbidex by Cargill)->Pigment.

The dry substance content of the composition was then determined. If required, the composition was diluted with water to adjust the viscosity, and dry substance content repeated.

For the purpose of degassing, the composition was stored for one day under gently steering.

Coating parameters: standard recycled-fibre folding box board sheets were used as a substrate for the barrier coatings. The sheets were coated with the sample coatings on the un (pre-) coated side. Coating was done in a single coating step with a lab curtain coating device. The parameters of the device, meaning the speed of the paper sheet and the flow volume, were adjusted according to the targeted coat weight and the stability of the curtain, as follows:

|       | Coating color        |                    |                    | Lab Curtain            |
|-------|----------------------|--------------------|--------------------|------------------------|
| Trial | Dry solids [%]       | Brookfield [mPas]  | Temperature [° C.] | Coater Speed [m/min]   |
| 1     | 17                   | 334                | 23                 | 150                    |
| 2     | 21                   | 154                | 30                 | 210                    |
| 3     | 20.7                 | 189                | 31                 | 210                    |
| 4     | 22.8                 | 191                | 28                 | 255                    |
| 5     | 22.3                 | 230                | 27                 | 255                    |

Afterwards the coated samples were dried for 1 minute at 120° C. in an oven.

Compositions:

| Samples | 1 | 2 | 3 | 4 | 5 | 6 |
|---|---|---|---|---|---|---|
| COATING INGREDIENTS (in parts) | | | | | | |
| PVOH 6-98 | Uncoated folding board box | 100 | 50 | 50 | 50 | 50 |
| Prototype A (C*Film 07325; Mw about 35 kD, Tg about 60° C.) | | | 50 | | | |
| Prototype B (C*iFilm 07412; Mw about 95 kD, Tg about 62° C.) | | | | 50 | | |
| Prototype a (C*Film 07325 + Sorbitol[1]) | | | | | 50 | |
| Prototype b (C*iFilm 07412 + Sorbitol[1]) | | | | | | 50 |
| Pigment Capim RG (by weight of total composition) | | 20% | 20% | 20% | 20% | 20% |
| pH | | 2.7 | 3.1 | 2.9 | 3.0 | 3.0 |
| Coat weight (g/m²) | | 15 | 15 | 15 | 15 | 15 |
| Solids content (%) | — | 17.0 | 21.0 | 20.7 | 22.8 | 22.3 |
| PERMEABILITY according to Tenax test (in μg/dm²) | | | | | | |
| MOSH < C20 | 515 | <25 | <25 | <25 | <25 | <25 |
| MOSH C20 > C35 | 860 | <25 | <25 | <25 | <25 | <25 |
| MOAH < C16 | <25 | <25 | <25 | <25 | <25 | <25 |
| MOAH C16 > C35 | 345 | <25 | <25 | <25 | <25 | <25 |
| TOTAL | 1745 | <100 | <100 | <100 | <100 | <100 |
| PERMEABILITY according to hexane test (in g/m²d) | 8278 | 36 | 88 | 56 | 36 | 23 |
| GREASE RESISTANCE according to Method 5 | 0 | 10 | 12 | 8 | 11 | 7 |

[1]C*Film and sorbitol in a weight ratio of 85:15

Results (Permeability)

Gas barrier functionality was assessed by measuring gas permeability, according to both Methods 4 and 2, respectively. The results are shown in the above table and demonstrate that compositions according to the present invention provide good mineral oil migration barriers, comparable to PVOH-based coatings.

Compositions, continued—the above experiments were repeated with the difference that various starches or starch compositions as indicated below were used. The properties of the various compositions comprising thereof are also reported:

| Formulation as in Table above using the following starch materials | | REFERENCE: Uncoated copy paper 80 g/m2 | 1 | 2 | 3 | 4 | 5 | 6 | 7 | 8 | 9 | 10 | 11 | 12 |
|---|---|---|---|---|---|---|---|---|---|---|---|---|---|---|
| Capim RG (pigment) | Parts dry | | 25% | 25% | 25% | 25% | 25% | 25% | 25% | 25% | 25% | 25% | 25% | 25% |
| C*iFilm 07412 | | | 75% | | | | | | | | | | | |
| C*Film 07325/Sorbidex (70/30) | | | | 75% | | | | | | | | | | |
| PVOH 6-98 | | | | | | 75% | | | | | | | | |
| PVOH 6-98/C*iFilm 07412 (50:50) | | | | | | | 75% | | | | | | | |
| PVOH 6-98/C*iFilm 07412 (50:50) | | | | | | | | 75% | | | | | | |
| PVOH 6-98/C*Film 07325 (50:50) | | | | | | | | | 75% | | | | | |
| PVOH 6-98/C*Film 07311 (50:50) (Mw about 125 kD, Tg between 60 and 70° C.) | | | | | | | | | | 75% | | | | |
| PVOH 6-98/C*Film 07302 (50:50) (Mw about 197 kD, Tg about 71° C.) | | | | | | | | | | | 75% | | | |
| C*Film 07325/Glycerin (70:30) | | | | | | | | | | | | 75% | | |
| C*Film 07311/Glycerin (70:30) | | | | | | | | | | | | | 75% | |
| PVOH 6-98/C*Film 07325/Glycerin (70:30) | | | | | | | | | | | | | | 75% |
| Solids content (%) | % | | 40.0 | 44.6 | | 23.0 | 40.0 | 40.0 | 26.6 | 25.3 | | 43.4 | 44.7 | 30.7 |
| Coater | | | | | | | Sumet | | | | | | | |
| Coat weight (g/m$^2$) | g/m$^2$ | | 10 | 10 | 10 | 10 | 10 | 10 | 10 | 10 | 10 | 10 | 10 | 10 |
| Sumet parameter | | | | | | | | | 448 | 475 | | 157 | 295 | 525 |
| Rod | | | 2 × 0.35 | 2 × 0.35 | | 1 × Sprenger 3 | | 2 × 0.35 | 1 × Sprenger 3 | | | 2 × 0.35 | 2 × 0.35 | 2 × 0.35 |
| Rod pressure | N | | 60 | 60 | | 60 | 60 | 60 | 60 | 60 | | 60 | 60 | 60 |
| IR dryer | % | | 100 | 100 | | 100 | 100 | 100 | 100 | 100 | | 100 | 100 | 100 |
| Drying time | min | | 1 | 1 | | 2 | 2 | 2 | 1 | 1 | | 1 | 1 | 1 |
| Roll pressure | N | | 150 | 150 | | 150 | 150 | 150 | 200 | 200 | | 200 | 200 | 200 |
| machine speed | m/min | | 15 | 15 | | 15 | 15 | 15 | 15 | 15 | | 15 | 15 | 15 |
| pH (adjusted) | | | 9.1 | 9.1 | | 9.3 | 2.9 | 9.1 | 6.3 | 6.3 | | 6.6 | 6.6 | 6.3 |
| Hexane permeation | g/m$^2$d | 9052 | 31 | 8 | 52 | 28 | 28 | 71 | 19 | 96 | 25 | 39 | 32 | 37 |

Methods

Method 1—Glass Transition Temperature of Starch Material

The glass transition temperature of a sample is analysed with using a Differential Scanning calorimeter, with a starting temperature of −60° C., an end temperature was 200° C., and a heating rate of 5° C./min. The samples analysed had a dry solids content of about 89 wt % (moisture about 11 wt %) relative to the total weight of the sample.

Method 2—Hexane Permeability of Coated Paper Products

This test is performed at 23° C. at 50% relative humidity. A sponge is placed in ajar. 9 ml of hexane are poured onto the sponge. The jar is then sealed with a lid having an opening and a sealing ring (internal diameter 63 mm). The opening is closed tightly with the test barrier material. The barrier material does not come into contact with the hexane-soaked sponge. The weight loss of the vessel is measured. The weight loss reflects the loss of gaseous hexane through the barrier material and is thus a measure of the permeability of the barrier against gaseous mineral oil components. The weight loss in grams is given in terms of 1 m$^2$ area of the paper, and then as g/m$^2$/day.

Method 3—Weight Average Molecular Weight

Sample Preparation:

The sample is dissolved in DMSO-water 90-10 v:v at about 2% dry substance for both starch and dextrins.

For Mw Determination:

The GPC system: Waters 600 controller with Waters 717puls auto-sampler.

Detector: Water 2414 RI (refractive index) detector.

The RI detector system is calibrated with a set of pullulans of known molecular weight. Also, a reference starch having a peak molecular weight of 20·10$^6$ (measured by static Light Scattering), and a five units dextrose linear polymer (DP 5) are injected. For each calibrant, the logarithm of the molecular weight is plotted against the retention time. After completion of a run, the data processing system fit the baseline, and cut the area comprised between the baseline and the chromatogram into a large number of small slices. The area of each slice is recorded, and the molecular weight corresponding to each slice is derived from the calibration curve. Using those data, the data processing system calculates the molecular weights.

Column: Shodex KS-806+Shodex KS-804+Shodex KS-802 (all sodium form) in series, at 75 C.

Eluent: NaOH 0.05 M in HPLC grade water, filtered through 0.45 um filter, degassed and maintained at about 70 C.

Flow: 1.0 ml/min

Injection: 20 ul

Detection: Differential refractive index

Data acquisition: Atlas from Thermo

Data processing; Caliber (GPC package from Polymer Labs)

Method 4—Permeability Tenax Test

The mineral oil migration into the food simulant Tenax® was determined based on DIN EN 14338 and with the use of a migration cell. The following migration conditions were applied:

Migration time: 5 days

Migration temperature: 40° C.

C-fractions: MOSH<C20, C20-C35
MOAH<C16, C16-C35

Determination of the carbohydrates from mineral oil (MOSH and MOAH) in packaging materials and in the food simulant Tenax® was carried out by a solid phase extraction and GC-FID, based on the recommended method of the BfR (Bestimmung von Kohlenwasserstoffen aus Mineralöl (MOSH und MOAH) oder Kunststoffen (POSH, PAO) in Verpackungsmaterialien und trockenen Lebensmitteln mittels Festphasenextraktion und GC-FID).

The samples were inserted into the migration cell and covered with Tenax®. Coated samples were clamped with the barrier coating face upward in the cell. Then the cell was firmly sealed and the investigation was carried out according to the conditions mentioned before. After the migration time the Tenax® of the cells was transferred into sample bottles and mixed with an internal standard of the PTS and hexane and extracted. After two hours of extraction the Tenax® was removed. The hexane phase was analysed.

Method 5—Grease Resistance Kit Test (Tappi T559)

The Kit test measures the degree of repellence or anti-wicking of paper and boards which have been treated with fluorochemical sizing agents used to prevent wetting of the cellulose fibers of the material. Test solutions with varying strengths of castor oil, toluene, heptane and turpentine are used. The highest numbered solution (the most aggressive) that remains on the surface of the paper without causing failure is reported as the "kit rating" (maximum 12).

The Kit test is used to quantify or compare the performance of papers and boards, used for food contact and other packaging applications where resistance to grease staining is important.

The results show, that coatings of the described compositions can achieve suitable barrier properties against unipolar substances, in the vapor phase (e.g. mineral oil migration), and liquid phase (e.g. oil and grease), which makes them optimum for fiber based packaging applications. These characteristics together with advantageous rheological properties can add value to existing paper/board barrier concepts, which are currently mainly based on synthetic polymers.

The invention claimed is:

1. A barrier coating composition comprising:
a starch material, wherein the starch material has a weight average molecular weight of 25,000 to 1,000,000 Dalton and a glass transition temperature (Tg) of no more than 120° C.;
a synthetic polymer, wherein the synthetic polymer is selected from the group consisting of polyvinyl alcohol, a polyamine, a polyacrylate, a polyamide, and a mixture thereof, and the starch material and the synthetic polymer are in a dry weight ratio of 1:2 to 2:1; and
a water-soluble plasticizer that is a polyol;
wherein a barrier coating layer comprising the barrier coating composition has a hexane permeability of no more than 50 g/m²d and a grease resistance of at least 3.

2. The barrier coating composition according to claim 1, wherein it has a dry solid content greater than 15-75% by weight.

3. The barrier coating composition according to claim 1, wherein it is suitable for curtain coating of cellulose-based substrates.

4. The barrier coating composition according to claim 1, wherein it has a Brookfield viscosity of 300-1100 mPa·s, when measured at 20° C., 100 rpm, and with a no. 4 spindle.

5. The barrier coating composition according to claim 1, wherein it further comprises a pigment.

6. A paper product comprising a cellulose-based substrate and a barrier coating layer, wherein
a) the barrier coating layer comprises the composition of claim 1;
b) the barrier coating layer has an average thickness of at least 3 μm and an average coat weight of 5 to 20 g/m²; and
c) the starch material has a weight average molecular weight of 50,000 to 1,000,000 Dalton and a glass transition temperature (Tg) of no more than 120° C.

7. The paper product according to claim 6, wherein the plasticizer is selected from the group consisting of a glycol, glycerol, sorbitol, glucose and mixtures thereof.

8. The paper product according to claim 6 for use as a packaging material.

9. A process for the production of a paper product comprising at least one barrier coating layer, comprising coating a cellulose-based substrate with a barrier coating composition according to claim 1.

10. A method of preventing migration of mineral oils through a cellulose-based substrate, the method comprising applying the barrier coating composition of claim 1 to a cellulose-based substrate.

11. The barrier coating composition of claim 1, wherein the starch material is a dextrin, and the plasticizer is sorbitol, glucose, or a mixture thereof.

12. The barrier coating composition of claim 1, wherein the starch material is a mixture of dextrin and a waxy starch.

13. The barrier coating composition of claim 12, wherein the dextrin and the waxy starch are present in a weight ratio of 50:50 to 20:1.

14. The barrier coating composition of claim 11, wherein the dextrin is a thermally modified starch.

15. The barrier coating composition of claim 1, wherein the starch consists of a thermally modified starch (TMS), a dextrin, a waxy starch, or a mixture thereof.

16. The barrier coating composition of claim 1, wherein the plasticizer is glycol, glycerol, sorbitol, glucose, or a mixture thereof.

17. The barrier coating composition of claim 1, wherein the plasticizer is sorbitol and the synthetic polymer is polyvinyl alcohol.

18. The barrier coating composition of claim 1, wherein a barrier coating layer comprising the barrier coating composition has a hexane permeability of no more than 20 g/m²d and a grease resistance of at least 5.

19. The barrier coating composition of claim 1, wherein the synthetic polymer is 5-50 wt % by dry weight of the barrier coating composition.

20. The barrier coating composition of claim 1, wherein the plasticizer is 3-40 wt % by dry weight of the barrier coating composition.

* * * * *